United States Patent [19]

Warnagiris

[11] Patent Number: 5,542,118
[45] Date of Patent: Jul. 30, 1996

[54] INDUCTION FIELD COUPLED TRANSMISSION SYSTEM INCORPORATING A PASSIVE TRANSMITTER

[76] Inventor: Thomas J. Warnagiris, 6620 Culebra Rd., San Antonio, Tex. 78228-0510

[21] Appl. No.: 305,218

[22] Filed: Sep. 13, 1994

Related U.S. Application Data

[63] Continuation-in-part of Ser. No. 836,411, Feb. 18, 1992, abandoned.

[51] Int. Cl.$^6$ .................................................. H04B 5/00
[52] U.S. Cl. ................ 455/41; 340/825.73; 340/870.37; 340/562; 455/290
[58] Field of Search .............................. 455/41, 67.4, 95, 455/96, 97, 98, 99, 100, 106, 107, 120, 121, 122, 123, 124, 125, 161.1, 169.1, 290; 340/447, 448, 572, 562, 825.06, 825.3, 825.34, 825.08, 825.54, 825.69, 825.72, 825.73, 870.37; 342/44, 51; 33/117, 120–123

[56] References Cited

U.S. PATENT DOCUMENTS

| | | | |
|---|---|---|---|
| 3,656,132 | 4/1972 | Brumbelow | 340/825.06 X |
| 3,723,966 | 3/1973 | Mueller | 340/447 |
| 3,737,911 | 6/1973 | Sakurgai et al. | 342/44 X |
| 4,027,286 | 5/1977 | Mavosko | 340/825.3 X |
| 4,578,992 | 4/1986 | Galasko | 340/448 |
| 4,618,822 | 10/1986 | Hansen | 340/572 |
| 5,227,798 | 7/1993 | Hildebrand | 342/51 |

*Primary Examiner*—Reinhard J. Eisenzopf
*Assistant Examiner*—Philip J. Sobutka
*Attorney, Agent, or Firm*—Gunn & Assoc.

[57] ABSTRACT

A remote, unpowered passive transmitter has a tank circuit, a coil and capacitor. The capacitor is variable to vary the frequency of the tank. This is coupled to a receiver having a hybrid splitter. With four ports, two balanced, opposing ports connect to two lines terminating in line impedance. The tank couples into one of the two line so that a difference signal is formed and output. Line loading forms a signal indicating tank frequency.

16 Claims, 1 Drawing Sheet

INDUCTION FIELD COUPLED TRANSMISSION SYSTEM INCORPORATING A PASSIVE TRANSMITTER

This application is a continuation-in-part of application Ser. No. 07/836,411 filed Feb. 18, 1992, abandoned.

BACKGROUND OF THE INVENTION

The present disclosure sets forth a method and apparatus enabling the transmission of information from a transmitter which operates without power. This particularly enables transmission from moving operative equipment which thereby transmits a variable which is encoded to transmit either analog or digital data. This involves the deployment of a transmitting apparatus in the midst of a complex mechanism of moving parts. The transmitter apparatus however is passive in the sense that it does not require a power supply, typically, batteries or the like. In many telemetry situations it is difficult, perhaps impossible, to provide electrical power to the transmitter. For instance, in rotating equipment where measurements are needed, power can be provided only by incorporating a battery with a transmitter which rotates with a transmitter. Alternately, electric power can be provided through slip rings or other communicators. There are many different techniques for doing this but they are mechanically difficult to implement and can be impossible in some situations. Certain physiological measurements also may require monitoring. For instance, medical implants can be placed beneath the skin to provide measurements of patients. This passive transmitter is able to get the signal through the skin without wires through the skin. There are a great variety of situations where this might be implemented.

The present apparatus is a passive or unpowered transmitter system. It features a passive transmitter which is defined by one or more elements which exhibit variable resonant frequencies. As an example, each element may be a tank circuit which is made up of a connected inductor and capacitor. For the purpose of illustration, consider tank circuit elements having relatively high Q values of perhaps 50 or higher. This is superficially similar to, but, markedly different from the passive tag system used in retail stores for theft protection. There, expensive garments and the like are equipped with a passive tag which is an energy absorbing system tuned to a particular and known frequency. If the clothing is stolen with the tag still attached, the tag interacts with the transmitters at the portals of the store so that the gateway coils connect with the tag, energy is absorbed at the tag, and this sounds an alarm. In this situation, the resonant frequency of the circuit involved with a tag is known. The tags are fixed at their resonant frequency and the detection system recognizes only those frequencies.

The present apparatus sets forth a system where the frequency is not known. The resonant frequency of the passive transmitter exemplary tank circuit is indeed variable to enable encoding of variable information in the form of an analog or digital signal. Consider as an example a system which provides an output of discrete measurements. For the purposes of example, assume that the variable to be measured is weight of a particular material in a mixing device. The mixing device is placed on a set of scales which operates by means of suitable mechanical connectors. The scales convert the weight into a value of capacitance. If the scales provide measurements of ten different increments, for instance, the weight can vary between 200–300 pounds, the scale might provide an indication of weights of 200, 210, 220, 230, etc. In this instance, the tank circuit readily using an adjustable capacitor, the capacitor providing values of capacitance given by the relationship of A+nB where A is a fixed capacitance corresponding to 200 pounds, B is an increment capacitance corresponding to 10 pounds and the value of n is a whole number integer between 0 and 9. In the foregoing example where the capacitance is installed parallel with a suitable inductor, this will vary the resonant frequency of the tank to any of several values which correspond to the capacitance. The frequency values will be denoted generally as $f_0, f_1, f_2 \ldots f_n$. These values obviously depend on the incremental change in capacitance so that the spacing might be a few kilohertz between adjacent frequencies. In the foregoing example, one does not know a priori the value of the tank capacitance and hence the resonant frequency of the tank circuit. However, the range is known in this particular example and is defined by the limiting frequencies $F_1$ and $F_2$ which encompass or include all of the frequencies $f_0, f_1, f_2 \ldots f_n$ representative of resonant frequencies of the tank circuit from the minimum to the maximum weight. Again this enables a signal to be obtained indicative of the variable transmitted from the passive transmitter.

The present system utilizes a timed based sweep between the frequencies $F_1$ and $F_2$. This will repetitively interrogate the tank circuit. At some unknown frequency, the tank circuit will achieve resonance. When it does, it absorbs energy from the receiver apparatus of the system thereby identifying resonant energy. Assuming that a relatively high Q tank circuit is used, the loading is fairly well defined. If, for instance, the Q is 100 or greater, a relatively sharply defined frequency is then identified. This can be quite easily discriminated in the receiving apparatus so that the frequency of the tank circuit is then known. Suitable scale factors enable conversion in this particular example from resonant frequency to weight on the scales. As will be understood, there is a field coupling involved which thereby enables the transmission to occur from the passive transmitter to a receiver system of data which can be calibrated as described.

Considering the present application further, it is particularly useful where the variable changes periodically. Assume that it is desirable to provide a sample every 10 seconds or 6 samples per minute. The present apparatus can be operated to scan or sweep between the frequencies $F_1$ and $F_2$ periodically, e.g., every 10 seconds. That is, the scan can be controlled in speed to require the exemplary 10 seconds where the scanning cycle is repeated time and time again. This provides a data which is interrogated at the desired rate for easy use.

SUMMARY OF THE DISCLOSURE

This disclosure sets out a passive transmitter system which incorporates the tank circuit formed of an inductor and a capacitor where one of the components is varied to encode data of interest when the tank resonant frequency falls between $F_1$ and $F_2$ thereby defining a perspective target range for the frequency of the system. The passive transmitter is not limited to a tank circuit embodiment. Virtually any circuit whose resonant frequency can be varied as a function of encoded data of interest can be used as a passive transmitter element of the invention.

A receiver is used in conjunction with the passive transmitter. The receiver has a signal source which generates a swept frequency signal. The frequency sweep is preferably linear between two frequencies $F_1$ and $F_2$ which encompasses the resonant frequency range of the passive transmitter. The detection system further utilizes a four port hybrid splitter with one function being analogous to that of a differential amplifier. Two branches of the hybrid splitter are fed to two transmission lines terminated at their characteristic impedance. One transmission line comprises a transverse electromagnetic cell which will hereafter be referred to as a TEM cell. The passive transmitter is operated within the TEM cell. A swept frequency ranging between the previously defined limiting values $F_1$ and $F_2$ is applied to the third branch of the hybrid splitter. When the applied frequency equals the resonant frequency of the passive transmitter, electromagnetic energy is absorbed within the TEM cell thereby creating an unbalanced condition between the transmission line comprising the TEM and the second transmission line. This imbalance is detected and quantified by a detector connected to the fourth port of the hybrid splitter. The output of the detector is applied as an input to a scope or other presentation device for recording and/or analysis. The resonant frequency measured by the receiver is indicative of the data of interest encoded in the passive transmitter.

In summary, data of interest is encoded within the passive transmitter as a resonant frequency of the transmitter circuit. For purposes of illustration, a tank circuit is used for the passive transmitter with either the inductor or the capacitor being varied as a function of the parameter to be transmitted. As a result, the resonant frequency of the tank circuit is varied as a function of the data to be transmitted. The receiver comprises a TEM cell in which the passive transmitter circuit is located. A swept frequency is applied to the receiver which encompasses all resonant frequencies of the transmitter. When the receiver frequency matches the resonant frequency of the transmitter, the transmitter resonates while energy is absorbed. The frequency at which the transmitter resonates is detected by the receiver and related quantitatively to the encoded transmitter data.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may add to other equally effective embodiments.

DETAILED DESCRIPTION OF THE PREFERRED EMBODIMENT

As a precursor, this brief tutorial on TEM cells is provided. A transverse electromagnetic cell is basically an enlarged coaxial transmission line that has provisions for placing material within the line. The TEM cell sets up a well defined cross electrical (E) and magnetic (H) field that can be used to give well controlled repeatable measurements of amplitude and phase of any energy absorbing signal conveyed through the TEM cell. TEM cells vary in physical size and frequency range and can be quite large physically. Humans are placed within such large cells in various physiological research programs. TEM cells are also commercially available from firms such as The Narda Microwave Corporation, Hauppauge, N.Y., Instruments for Industry, Farmingdale, N.Y., and Amplifier Research Souderton, Pa.

Figure 1:
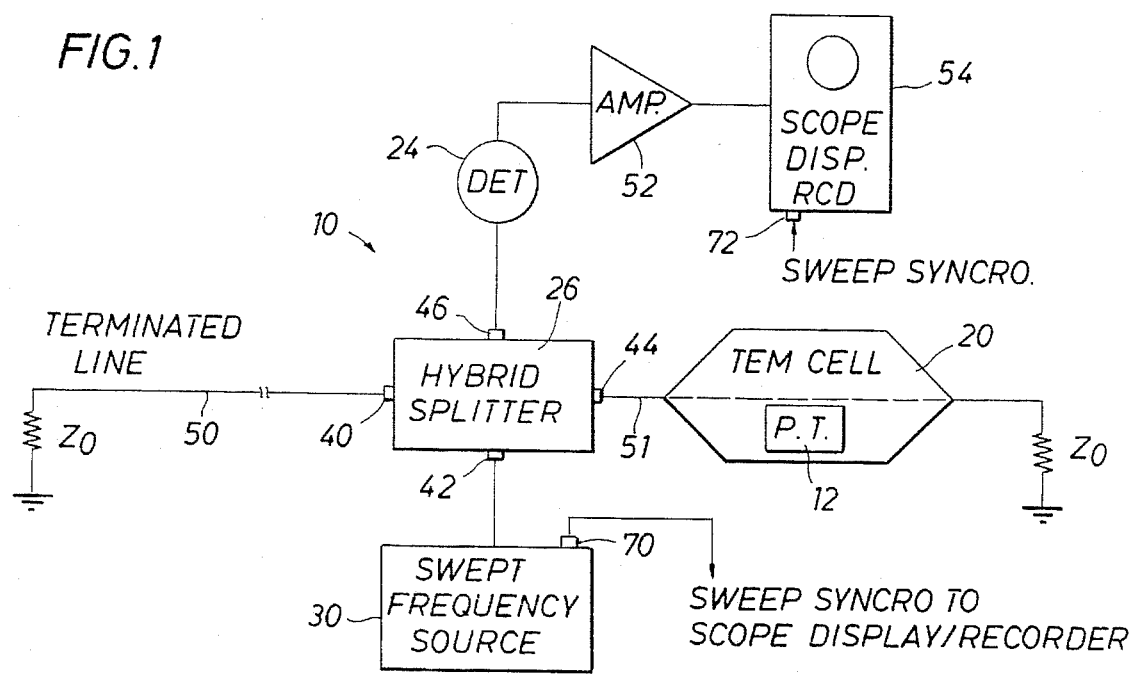
FIG. 1 is a general view of the transmitter and receiver portions of the induction field couple transmitter system incorporating a passive transmitter.
Figure 2:
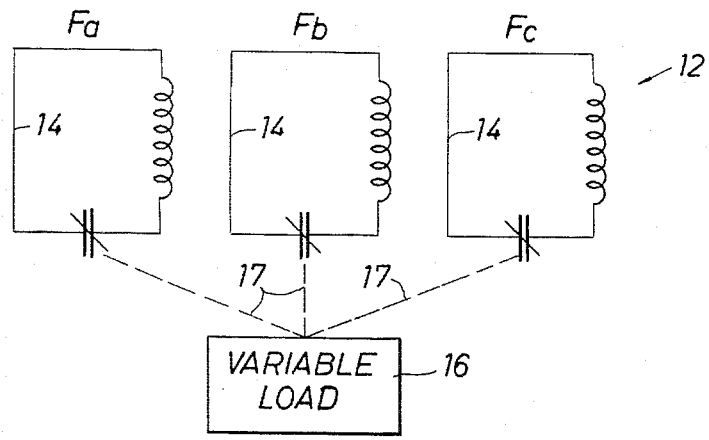
FIG. 2 is a more detailed illustration of the passive transmitter component of the data transmission system.

Attention is now directed to FIG. 1 of the drawings. The numeral 10 identifies a transmitter and receiver system in accordance with the present disclosure. The passive transmitter is identified by the numeral 12. Attention is next drawn to FIG. 2 wherein details of the passive transmitter elements are illustrated as tank circuits 14. Tank circuits are used for the purpose of illustration and it is noted that other variable resonance circuits can likewise be employed. The tank circuit is formed by the illustrated circuit components of an inductor connected to a capacitor. Three such tank circuits are shown. As will be understood, one or more such circuits can be used. Developing however an example showing how three can be used, a variable load 16 of some suitable mechanism is also illustrated. Assume for the purposes of the example that the variable to be measured is rotations per minute (RPM) of a device. Assume for exemplary purposes that some type of measuring device measures the RPM of a rotating machine. The rotating machine can be positioned within the TEM chamber which can be quite large. Alternately, the rotating machine can be external to the TEM chamber 20 and connected by mechanical or electrical means to the passive transmitter 12 located within the TEM chamber. Assume further that the RPM is a three digit number ranging from perhaps units to several hundred. In that example, three digits are necessary to transmit the full range of RPM values. FIG. 2 shows mechanical connections 17 from the variable measuring device at 16 to the three tank circuits which makeup the passive transmitter. Each of the three tank circuits is formed in the same fashion meaning that all have an inductor and a capacitor. Generally, it is easy to make an adjustable or variable capacitor so the preferred form incorporates an adjustable capacitor using the tank circuit embodiment. Assuming that the variable load varies over three orders of magnitude of data, one of the tank circuits provides a signal indicative of units, another indicates tens of units and the last indicates hundreds of units. Each of the tank circuits would then preferably include a fixed capacitor having a capacitance of A and a variable capacitor having a capacitance of nB. The term B represents an incremental measure of capacitance and n represents a whole number integer ranging from 0 to 9 so that the full decade of values is provided. For one, or for indeed all three of the tank circuits, the capacitors are each represented by the relationship A+nB. In this particular instance, it is conveniently possible to use identical capacitance in the three tank circuits. The three tank circuits however operate at different frequencies in this example because it is possible to vary the inductors to different values. Thus, each of the three tanks operates within its own range where the three ranges do not overlap. The ranges of each of the three tanks can be separated by some suitable spacing. Choosing an example, assume that one of the tank circuits operate at about 10.0 MHz while the other tank circuits operates at 10.5 and 11.0 MHz. This spacing still permits an extremely wide range of frequencies for the incremental measurements so that three orders of magnitude of data can be encoded. In the example used, this would permit the encoding of three digits so that the maximum RPM value can be extended up to 999 units. This will readily accommodate the exemplary problem mentioned where RPM can range as high as the hundreds. The example used is not a limitation of the present disclosure and serves an illustrative purposes only. More importantly, it shows how three similar passive tank circuits having similar construction can be used to provide encoding for three different variables (units, tens, and hundreds in this example).

Attention is again directed to FIG. 1 which illustrates details of the receiver section of the system. The receiver has a swept frequency source 30 which provides a sweep frequency ranging between $F_1$ and $F_2$ where $F_1$ and $F_2$ encompass the variable resonant frequency ranges of all of the transmitter elements 14. The detector system further uses a four port hybrid splitter 26. The branches 40 and 44 of the hybrid splitter are connected to transmission lines 50 and 51 respectively wherein transmission line 51 contains a TEM cell 20. Under no load conditions within the TEM cell, transmission lines 50 and 51 terminate at their characteristic impedance and the transmission lines are balanced. A swept signal source 30 inputs swept frequencies between $F_1$ and $F_2$ into the hybrid splitter through the port 42. When one or more elements 14 of the passive transmitter 12 becomes resonant, energy is absorbed within the TEM cell 20 creating an imbalance condition between transmitter lines 50 and 51. The imbalance is detected by the detector 24 connected to the port 46 of the hybrid splitter. The output of detector 24 is further amplified by an amplifier 52 and input to a scope or other presentation or recording means illustrated by the numeral 54. The swept frequency source 30 also outputs a signal at the port 70 which is input at the second port 72 of the display unit 54 for synchronization purposes.

Figure 3:
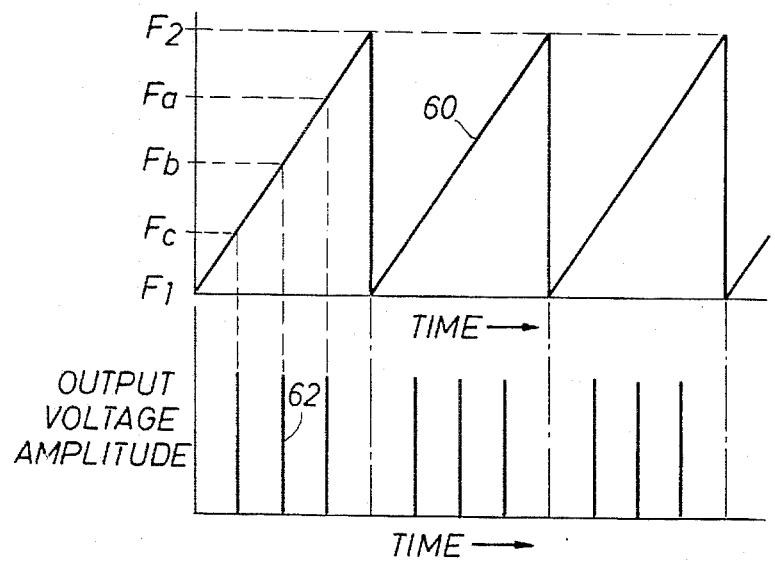
FIG. 3 illustrates the swept frequency saw tooth pattern along with output voltage indicating residence conditions of the receiver portion of the overall system.

FIG. 3 shows two graphs which correlate time and frequency in the upper graph and time and output signal amplitude in the lower graph. The upper graph shows a curve 60 which illustrates how the swept frequency oscillator 30 operates between two previously defined boundary frequencies denoted by $F_1$ and $F_2$. Preferably, a linear sweep is carried out. This generates a linear sweep from $F_1$ to $F_2$ which is then repeated so that the saw tooth wave form is generated as illustrated in FIG. 3 of the drawings. Moreover, it shows how the frequency sweep between frequencies of $F_1$ and $F_2$ passes through the resonant values associated with the three tank circuits 14. The tank circuits provide loading at their resonant frequencies. The units, tens and hundreds tank circuit elements are distinguished by the subscripts a, b, and c, respectively and the corresponding resonant frequencies are designated as $F_a$, $F_b$ and $F_c$. There is a second curve in FIG. 3 at 62 which indicates the output voltage from amplifier 52 on the occasion of loading by any one of the tank circuits in the passive transmitter. Energy will be absorbed within the TEM cell 20 at the resonant frequencies thereby creating an unbalanced condition between transmission lines 50 and 51. This condition is sensed by the detector 24 which creates an output voltage which is further amplified by the amplifier 52 as previously described. This amplifier output is reflected by the peaks in curve 62. These peaks occur at the frequency cross over as determined by sweep in the saw tooth wave form 60 as shown in FIG. 3. The position in time of the peaks in this curve, along with the known resonant frequency ranges of the resonant elements 14, are used with the curve 60 to uniquely determine the frequency $F_a$, $F_b$ and $F_c$ at which resonance occurs in each of the three elements of the exemplary passive transmitter. This process is shown graphically for the first illustrated sweep. Frequencies $F_a$, $F_b$ and $F_c$ for each sweep cycle are related to the encoded data $D_i$ for each transmitter element through the previously discussed relationship $D_i=K_i(A_i+nB_i)$ where $K_i$ is a calibration constant. The subscripts i=a,b,c denote a specific transmitter element 14 which in this example represents either units, tens or hundreds, respectively.

Considering further the exemplary system discussed above where the three tank circuits are resonant in the range of 10 to 11 MHz, the saw tooth can sweep between $F_1=9.5$ and $F_2=11.5$ MHz for example. Sweeping through a more tightly defined range is also permissible. Sweeping through the three ranges where the three passive tanks circuits are resonant assures that all of the encoded data are obtained from all three of the elements of the exemplary passive transmitter.

While the foregoing is directed to the preferred embodiment, the scope hereof is determined by the claims which follow.

What is claimed is:

1. A method of transmitting a variable comprising the steps of:
   (a) forming a tunable tank circuit having an element therein for encoding a variable, said encoding step being accomplished by varying a capacitor within said element;
   (b) forming a receiver within the range of field coupling with said tank circuit, wherein said receiver comprises a hybrid splitter having two output ports connected to first and second terminated lines having specific characteristic impedances, and one of said terminated lines includes a TEM cell field connected to said tunable tank circuit;
   (c) tuning the receiver between first and second frequencies so that the receiver crosses over the resonance frequency of the tank circuit; and
   (d) detecting the receiver signal level to indicate coincidence between the tuned frequency of the receiver and the resonance frequency of the tank circuit so that the variable encoded by the tunable tank circuit is indicated by the receiver frequency.

2. The method of claim 1 wherein said receiver includes a sweep frequency oscillator connected to the hybrid splitter to vary the frequency input, and including the step of measuring the differences voltage as the frequency is varied.

3. The method of claim 1 wherein said hybrid splitter connects to a detector, and the detector is operated to output the difference signal from the terminated lines.

4. The method of claim 3 including the step of operating the first and second terminated lines at a characteristic impedance and which lines form a null at quiescent conditions which null is output to a detector.

5. The method of claim 4 wherein the frequency of the receiver is swept linearly over time between the first and second frequencies.

6. The method of claim 5 wherein the receiver frequency is linearly swept repetitively at the same rate.

7. The method of claim 6 wherein the receiver frequency is swept through the resonant frequency of the tank circuit to cause a signal level reduction at the receiver.

8. The method of claim 5 including the step of placing at least two separate tank circuits coupled to the receiver wherein both of the tank circuits are resonant independently of each other between the first and second frequencies.

9. The method of claim 8 wherein one of said tank circuits encodes a first variable of m values and the second encodes n values where m and n are whole number integers.

10. The method of claim 9 wherein m and n encode units and tens of units.

11. A method of transmitting a variable comprising the steps of:

(a) forming at least two separate tunable tank circuits having elements therein for encoding a variable;

(b) forming a receiver having within a first and a second identical lines terminating in line characteristic impedances, wherein said receiver further comprises a hybrid splitter having two ports connected to said lines so that said hybrid splitter operates a TEM load in one of the two lines;

(c) placing said at least two separate tunable tank circuits within the range of field coupling of said receiver lines wherein both tank circuits are resonant independently of each other between said first and second receiver frequencies wherein one of said tank circuits encodes a first variable of m values and the second encodes n values where m and n are whole number integers and wherein m and n encode units and tens of units;

(d) tuning said receiver between first and second frequencies so that the receiver frequencies cross over the resonance frequencies of said tank circuits;

(e) subtracting signal levels output by said first and second receiver lines to obtain a difference signal encoding the tank circuit variables; and (f) using said difference signals to indicate coincidence between instantaneous frequency of the receiver and the resonance frequency of the tank circuits so that the variables encoded by; said tunable tank circuits are indicated by the receiver frequency.

12. The method of claim 11 wherein an output device is connected to represent signal differences from said lines.

13. The method of claim 11 wherein said hybrid splitter includes four ports and including the step of operating said hybrid splitter so that one port is an input and another port is an output; and providing matched impedances at two remaining ports so that said two ports develop a null output signal at quiescent operation.

14. The method of claim 13 including the step of linking the tunable tank circuit to a TEM cell in one of the identical lines to enable data transfer.

15. The method of claim 14 wherein said TEM cell is operated to change the balance between said two receiver lines.

16. The method of claim 15 wherein said TEM cell is coupled so that receiver line output is modified by tank circuit loading.

* * * * *